United States Patent [19]

Netzel

[11] 4,101,730
[45] Jul. 18, 1978

[54] TERMINATION FOR STRANDED CABLE

[75] Inventor: Philip C. Netzel, Milmont, Pa.

[73] Assignee: Gould Inc., Rolling Meadows, Ill.

[21] Appl. No.: 771,943

[22] Filed: Feb. 25, 1977

[51] Int. Cl.² ............................................. H02G 15/02
[52] U.S. Cl. .................. 174/75 R; 174/21 C;
    403/275; 403/277; 403/374
[58] Field of Search ............... 174/75 R, 21 C, 21 R,
    174/19; 403/275, 277, 374, 371

[56] References Cited

U.S. PATENT DOCUMENTS

| 1,870,833 | 8/1932 | Burr ................................ 174/75 R |
| 3,872,232 | 3/1975 | Goodman ......................... 174/19 |
| 4,025,213 | 5/1977 | Schäfer et al. ................... 403/374 X |

*Primary Examiner*—Thomas J. Kozma
*Attorney, Agent, or Firm*—Ostrolenk, Faber, Gerb & Soffen

[57] ABSTRACT

A termination for the stranded cable used in a gas-insulated bus is disclosed, where the termination consists of an expander structure which wedges into a central area of the stranded cable and presses the stranded cable against an outer conductive retainer cylinder. The expander structure consists of a cylindrical double-ended body which receives sliding wedges at its opposite ends which are drawn together by the operation of an externally accessible bolt. The sliding wedges are keyed to the cylindrical member to prevent relative rotation of the sliding wedges relative to the cylindrical member as the wedges are drawn together.

9 Claims, 7 Drawing Figures

U.S. Patent   July 18, 1978   Sheet 1 of 3   4,101,730
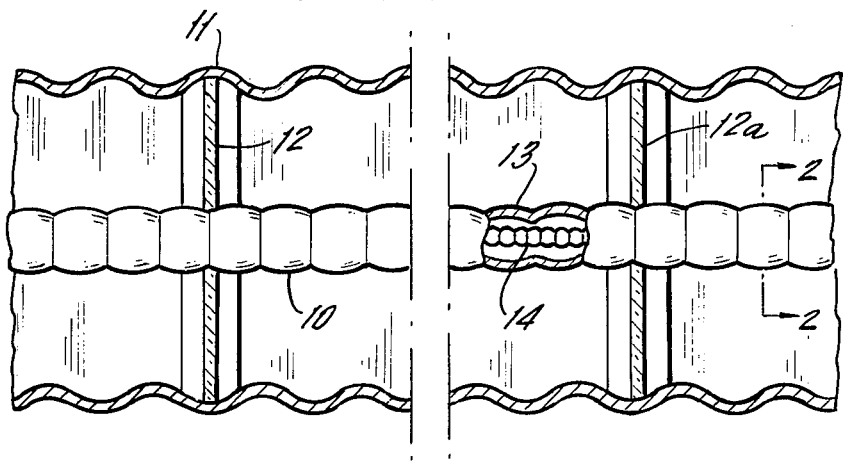
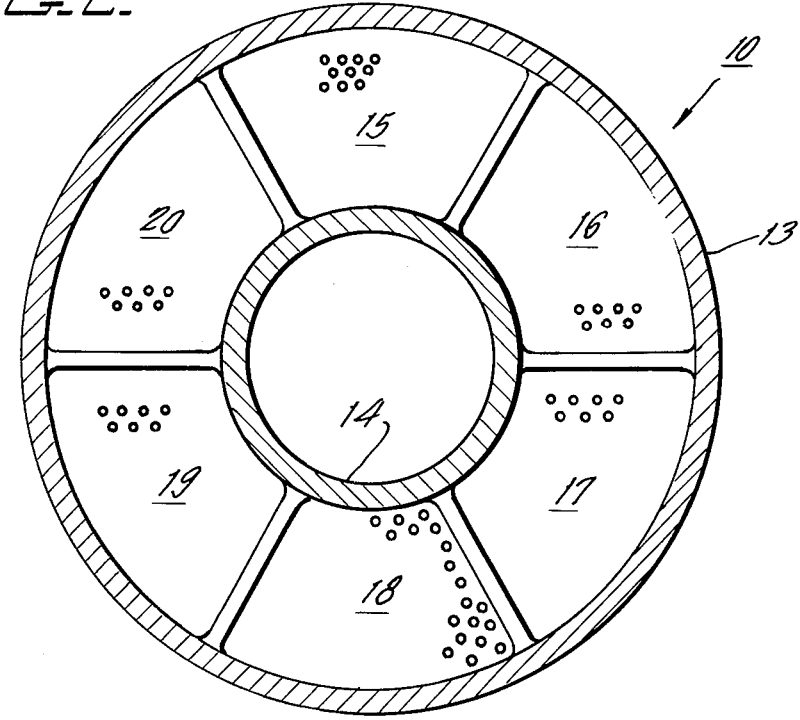
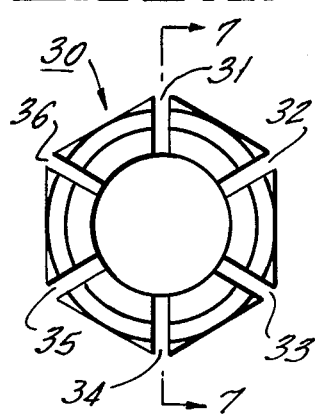
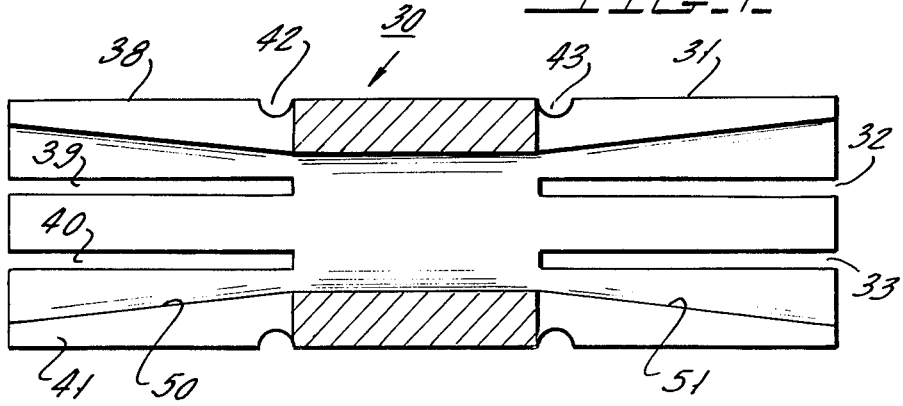

TERMINATION FOR STRANDED CABLE

BACKGROUND OF THE INVENTION

This invention relates to high voltage gas-insulated transmission lines, and more specifically relates to a novel termination structure for the flexible stranded conductor of a gas-insulated transmission line.

High voltage gas-insulted transmission lines are well known for carrying power in high voltage systems. Thus, in order to reduce the size of an electrical substation or an electrical transmission line, which deals with voltages, for example, in excess of about 100,00 volts, it is known to contain the high voltage components within grounded metallic housings which are filled with an insulation gas, such as sulfur hexafluoride under a few atmospheres of pressure.

The conductors for such systems commonly consist of a central conductor surrounded within a coextensive grounded housing which is filled with an electronegative gas such as sulfur hexafluoride or a mixture of electronegative gases. Such a system is shown in U.S. application Ser. No. 734,965, filed Oct. 22, 1976, in the name of P. C. Netzel and T. F. Brandt, entitled INSULATION SPACER FOR FLEXIBLE GAS-INSULATED TRANSMISSION LINE and assigned to the assignee of the present invention (C-1802[ATG/SD]). As shown in the above application, in order to make the transmission line flexible, it is common practice to use a corrugated grounded housing and a stranded central conductor, the strands of which are contained between inner and outer corrugated conductor tubes. The strands themselves are commonly wound in trapezoidal-shaped segments disposed around the central core tube and then covered with the outer corrugated tube sheath.

It is necessary to provide a connection to the central cable at the termination of the flexible gas-insulated bus. This connection is difficult to make because of the need to make firm connection to a multiplicity of strands. The terminal also must be easily made with conventional tools since connections are frequently made in the field, as where two bus sections are connected together or the bus termination is to be connected to some other piece of electrical apparatus in the field.

BRIEF SUMMARY OF THE INVENTION

In accordance with the present invention and before the termination structure is connected to the stranded bus, the outer and inner sheaths or corrugated conductive tubes containing the stranded conductors are stripped away and are placed within a rigid outer conductive cylinder. A novel terminal conductor consists of a hollow conductive tube having segmented ends with wedge-shaped internal cross-sections is then placed within the interior diameter defined by the trapezoidal strand sections of the flexible conductor to be terminated. Two sliding wedge nuts are then placed at the opposite ends of the tube. A conductive cylinder is also placed over the outer diameter of the strands. A bolt then extends into the two wedge nuts and is rotatable from a region external of the bus and operates to draw the wedge nuts together in order to force the wedge-shaped ends of the conductive tube outwardly and into the interior diameter of the trapezoidal strand sections. This forces the strand sections against the interior of the outer conductive cylinder, thereby to make firm electrical connection between the stranded sections and the outer conductive cylinder. The outer conductive cylinder then provides a solid terminal for the stranded bus.

The connector of the invention is one which can be easily manipulated by relatively unskilled personnel with commonplace tools and the connection can be made under adverse conditions which might be encountered during field installation. Moreover, the termination structure can be self-contained in a separate housing section which can be easily connected to the end of the housing of a gas-insulated bus in order to terminate the bus section.

All components of the connector can be made of aluminum for connection to a stranded aluminum conductor. Moreover, it will be noted that no special tools are required for the termination of the bus, in accordance with the invention, other than a wrench and no special treatment is required for the cable other than the removal of the sheath and core before connection of the terminal structure.

BRIEF DESCRIPTION OF THE DRAWINGS

FIG. 1 is a longitudinal cross-sectional view through the axis of a flexible gas-insulated bus which can be terminated in accordance with the present invention.

FIG. 2 is a cross-sectional view of FIG. 1 to illustrate the construction of the stranded flexible bus conductor.

FIG. 6 is an end view of the novel terminal expander cylinder of the present invention which is shown in FIGS. 3 and 4 as pressing the stranded aluminum conductor against an outer conductive cylinder.

FIG. 7 is a cross-sectional view of FIG. 6 taken across the section line 7–7 in FIG. 6.

DETAILED DESCRIPTION OF THE DRAWINGS

Referring first to FIGS. 1 and 2, there is illustrated a section of a gas-insulated transmission line of flexible construction of the type shown in above-noted copending application Ser. No. 734,965. Thus, the transmission line section of FIG. 1 may have any desired length and consists of a central flexible conductor 10 supported within a flexible outer metallic housing 11. The outer housing 11 may have an outer diameter, for example of 300 millimeters, where the bus is to be a 169 kV bus. Outer housing 11 may be formed conventionally of aluminum or any other conductive material.

Insulating spacers or supports 12 and 12a and other similar supports are provided along the length of conductor 10 and housing 11 to centrally support the conductor 10 within housing 11.

Figure 5:
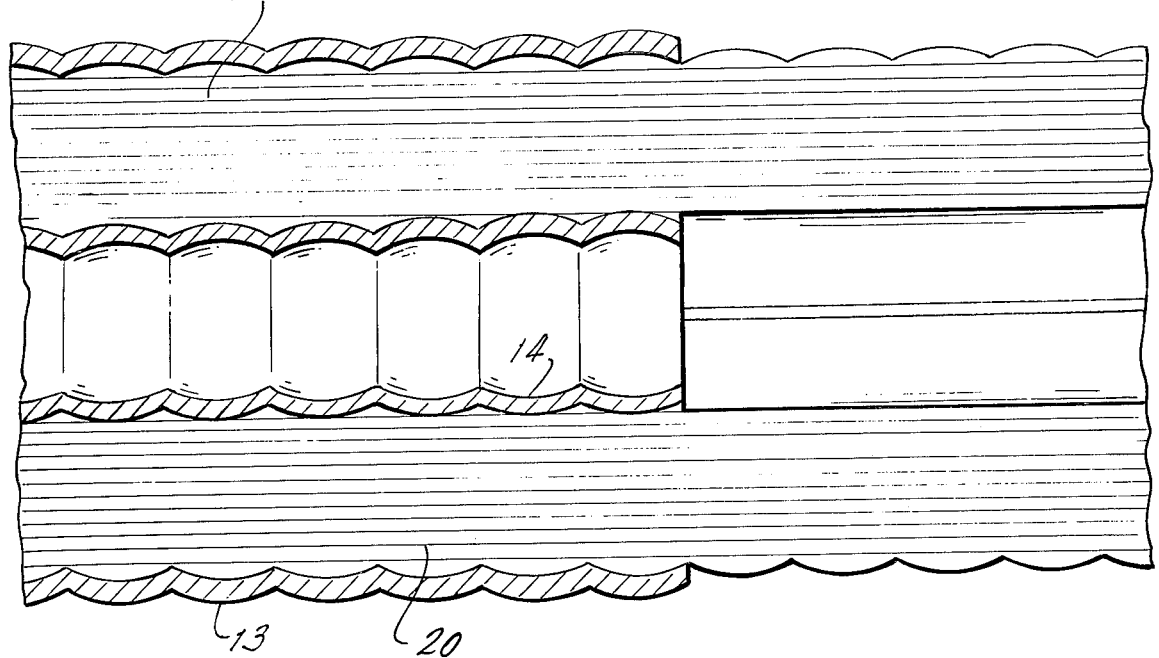
FIG. 5 illustrates the manner in which the flexible conductor of FIG. 2 is prepared by the removal of the inner and outer corrugated tubes or sheaths prior to connection of the novel terminal of the present invention to the central conductor.

As shown in FIGS. 1, 2 and 5, the flexible conductor 10 consists of an outer conductive sheath 13 which is a corrugated tube for flexibility, an inner corrugated sheath 14, which is also corrugated for flexibility, and a plurality of trapezoidally shaped conductive strand sections, best shown in FIG. 2 as the trapezoidally shaped conductive strand packages or segments 15 to 20. The conductive strands as well as conductive sheaths 13 and 14 may be of aluminum.

FIG. 2 illustrates the use of six trapezoidal segments 15 to 20 but other numbers of segments could have been used. The manufacture of these trapezoidal segments is well known and each is made of a plurality of small gauge parallel aluminum wires. These segments are wound much the same as a rope and pass through dies which form the trapezoidal shapes shown. The individual segments are then wound on the corrugated tube 14 and then covered with the corrugated outer sheath 13.

The present invention provides a novel terminal structure for making connection to the terminal end of conductor 10. In accordance with the invention and in order to make the connection, a short length of the inner and outer sheaths 13 and 14 is removed, as illustrated in FIG. 5, at the right-hand end of conductor 10. Thereafter, an aluminum terminal expander member 30 is inserted into the end of the cable strands, as shown in FIG. 3.

The expander 30, shown in detail in FIGS. 3 and 4, will have any suitable diameter to fit between the various strand packages and preferably has the hexagonal cross-section best seen in FIGS. 4 and 6 in order to key expander 30 against relative rotation with conductor 10 as the expander is being operated, as will be later described.

The expander 30 is also provided with slotted end sections shown, for example, by the slots 31 to 36 of FIG. 6 and similar slots partly shown in FIG. 7 as slots 38 to 41 in the other end of expander 30. Note that two machine grooves 42 and 43 shown in FIG. 7 are also formed in the terminal expander member 30 to permit the outward bending of the fingers defined by the various slots 31 to 41. Note further that the interior diameters 50 and 51 at the ends of the terminal expander are slightly conical in shape, whereby the conical diameters 50 and 51 are at an angle of about 9° to the axis of expander 30.

Figure 3:
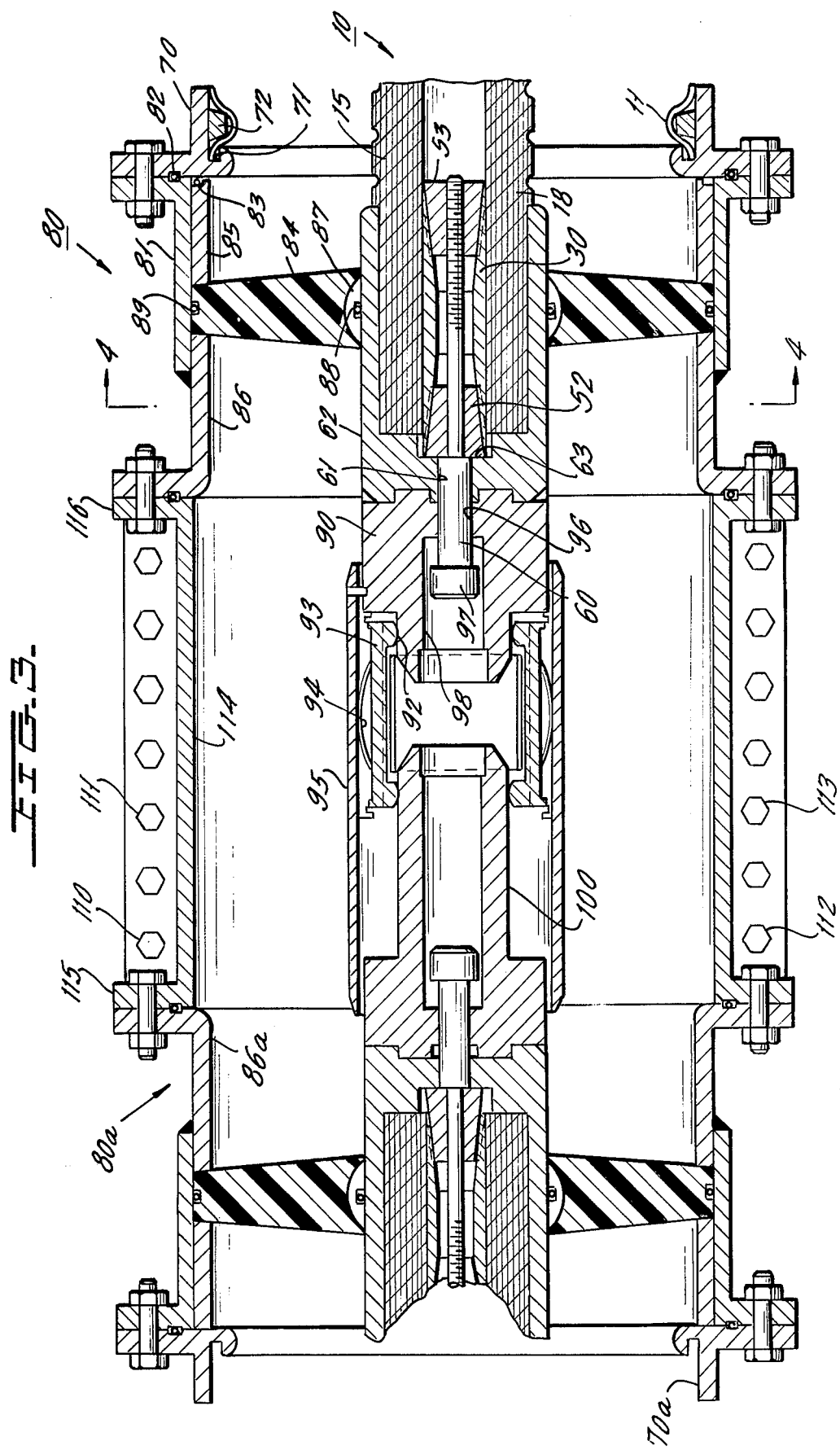
FIG. 3 is an enlarged cross-sectional view of the novel terminal structure of the present invention as applied to the ends of two gas-insulated bus sections to connect the two sections together.
Figure 4:
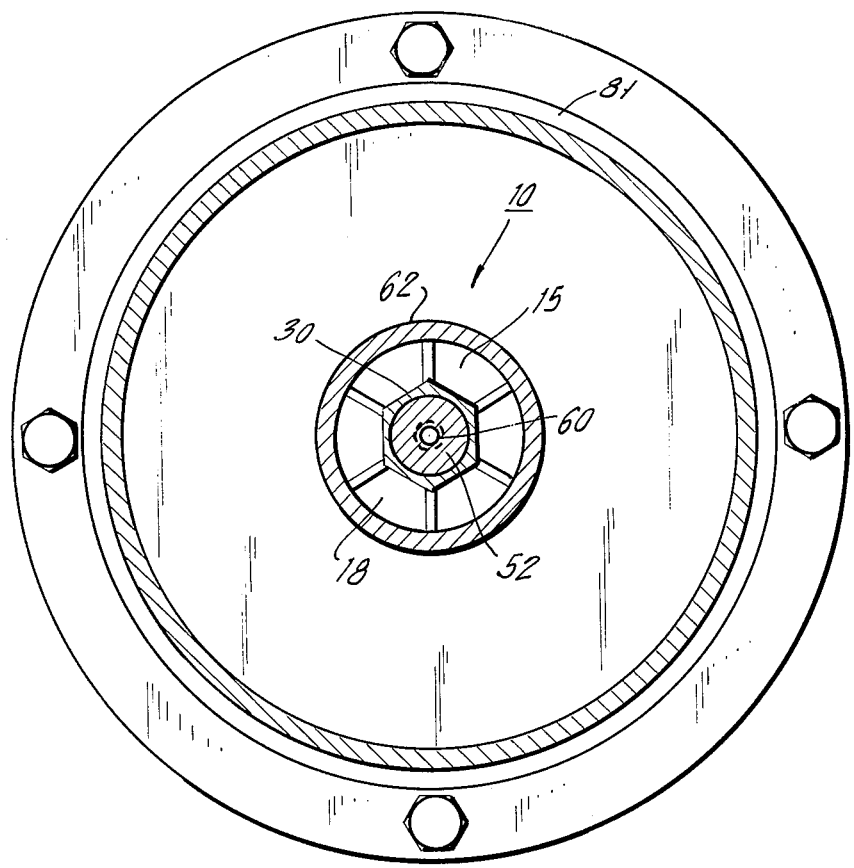
FIG. 4 is a cross-sectional view of FIG. 3 taken across the section line 4–4 in FIG. 3.

The terminal expander 30, as best shown in FIGS. 3 and 4, then receives wedge nuts 52 and 53 in its opposite ends, which wedge nuts have conical shapes which generally conform in angle or which is sharper in angle than the angle defined by the conical internal surfaces 50 and 51, respectively. Wedge nut 53 threadably receives the threaded portion of bolt 60; whereas wedge nut 52 has a large enough opening to pass over the unthreaded shank of bolt 60.

Bolt 60 extends through opening 61 in an outer solid conductive cylinder 62 which encloses the outer diameter of the sheaths 15 to 20 of the conductor 10. Bolt 60 has a shoulder 63 which bears against wedge 52. Bolt 60 passes through wedge 52 and is threaded into wedge 53. As will be later described in detail, the tightening of the bolt 60 causes the wedges 52 and 53 to be drawn together, thereby to cause the fingers, defined by the slots in the opposite ends of expander 30, to flex outwardly, thus driving the trapezoidal strand sections into high pressure contact with the outer conductive cylinder 52.

It will be noted that the hexagonal shape of expander 60 causes it to key into the individual strand sections to prevent relative rotation of the expander 30 within cable 10 as the bolt 60 is being tightened. Any suitable connection can then be made to the solid conductive cylinder 62 with much greater ease than to the individual stranded elements of the cable 10.

One terminal subassembly for an entire flexible cable is shown in FIG. 3, wherein a terminating flange 70 clamps onto the end of corrugated housing 11 by clamping the end of corrugated housing 11 under the lip 71. Projecting locking members, or a continuous split locking ring 72, projects into the end corrugation of housing 11. The locking ring 72 may be segmented and can be connected to the flange 70 as by externally operated bolts or the like, not shown.

FIG. 3 illustrates the connection of the terminal end of the cable shown on the right-hand side of FIG. 3 to a similar apparatus which may be another terminal end of another flexible cable which would be supported by the terminal flange 70a, shown on the left-hand side of FIG. 3.

FIG. 3 also shows a terminal subassembly 80 which can be preassembled in the factory and easily clamped to the terminal end of the gas conductor in the field. Terminal structure 80 consists of an outer bolt flange 81 which can be clamped to flange 70 and compress seals 82 and 83 to ensure a gas-tight connection to the flange 70 and the outer housing 11. A disk-shaped support insulator 84 is then contained between ring 85 and bolt ring 86 which are welded to the bolt ring 81. The conductive cylinder 62 is then connected to the metallic insert 87 of insulator 84, with suitable sliding seal 88 providing a gas seal against leakage of gas from the interior of housing 11. A similar seal 89 seals the top of insulator 84.

The conductor 62 is then welded to a plug-in type conductor 90 which has a sliding contact surface 92, which is engageable by sliding finger contacts 93 which are circularly arranged around the periphery of member 90.

The entire subassembly 80 described above to the left of flange 70 is factory-assembled and can be easily and simply connected to the end of the bus 10 in the field. Thus, the assembler will first insert the expander 30 into the properly prepared cable 10 and will thereafter bolt the assembly 80 to the end of the bus by bolting together flanges 81 and 70. Thereafter, the bolt 60 is rotated to cause wedges 52 and 53 to be drawn together, thereby to compact the strand sections 15 to 20 against conductive cylinder 62 in a compact low-resistance manner.

Note that, after pressure is applied, the wedges 52 and 53 will lock in place because the low angle used on the wedges. The assembly may then be used for plug-in connection in a conventional manner to any other component.

By way of example, in FIG. 3, an assembly is shown to the left of the figure, which includes flange 70a and an assembly 80a which can be identical to assembly 80 and which contains an elongated male contact 100 which slidably receives the conductive fingers 93 in order to connect conductive member 90 to the conductive member 100. The assembly of the finger contacts 93 and their respective biasing springs 94 are contained within a corona shield 95 which is loosely fixed to the end of conductive member 90. It will be noted that the bolt 60 extends through an opening 96 in member 90 and the bolt head 97 is accessible through the channel 98 in member 90.

A mechanical and gas-tight connection is then made between flange 86 of a subassembly 80 and flange 86a of flange subassembly 80a by semicircular housing sections which bolt together along their axial length by bolts, such as bolts 110, 111, 112, and 113 to form a cylindrical housing 114 which has bolt flanges 115 and 116 which are connected to flanges 86a and 86, respectively.

Although a preferred embodiment of this invention has been described, many variations and modifications will now be apparent to those skilled in the art, and it is therefore preferred that the instant invention be limited not by the specific disclosure herein but only by the appended claims.

The embodiments of the invention in which an exclusive privilege or property is claimed are defined as follows:

1. An electrical terminal in combination with a stranded conductor; said stranded conductor comprising, at its terminal end, a generally hollow cylindrical form; said terminal comprising a rigid conductive outer sleeve closely surrounding the exterior of said generally hollow cylindrical form; a hollow elongated cylindrical conductive member disposed inside said cylindrical stranded conductor form; a pair of wedge-shaped nuts fitted into the opposite ends of said hollow elongated cylindrical conductive member; bolt means connected to said pair of wedge-shaped nuts and operable for drawing said wedge-shaped nuts toward one another to outwardly distort the respective ends of said hollow elongated cylindrical member and to press said strands of said generally hollow cylindrical form into high pressure engagement with said conductive outer sleeve; said bolt means being operable from a region external of said hollow cylindrical form.

2. The terminal of claim 1 wherein said stranded conductor comprises a plurality of trapezoidal-shaped strand segments disposed in cylindrical form; said elongated cylindrical conductive member having a polygonal outer cross-section, whereby said polygon shape is keyed into and between adjacent trapezoidal shaped segments to prevent relative rotation between said cylindrical conductive member and said stranded conductor.

3. The terminal of claim 1 wherein the opposite ends of said cylindrical conductive member are slotted to define a plurality of outwardly flexible fingers.

4. The terminal of claim 1 wherein the inner diameter of the said opposite ends of said cylindrical conductive member is tapered to cooperate with the taper of the outer surface of said wedge-shaped nuts.

5. The terminal of claim 1 wherein said bolt means comprises a threaded bolt having an enlarged shoulder on the shank thereof; said shoulder engaging the outer lateral surface of one of said wedge-shaped nuts; said threaded bolt being threaded into the other of said wedge-shaped nuts.

6. The terminal of claim 3 wherein the inner diameter of the said opposite ends of said cylindrical conductive member is tapered to cooperate with the taper of the outer surface of said wedge-shaped nuts.

7. The terminal of claim 6 wherein said bolt means comprises a threaded bolt having an enlarged shoulder on the shank thereof; said shoulder engaging the outer lateral surface of one of said wedge-shaped nuts; said threaded bolt being threaded into the other of said wedge-shaped nuts.

8. The terminal of claim 6 wherein said stranded conductor comprises a plurality of trapezoidal-shaped strand segments disposed in cylindrical form; said elongated cylindrical conductive member having a polygonal outer cross-section, whereby said polygon shape is keyed into and between adjacent trapezoidal-shaped segments to prevent relative rotation between said cylindrical conductive member and said stranded conductor.

9. The terminal of claim 7 wherein said stranded conductor comprises a plurality of trapezoidal-shaped strand segments disposed in cylindrical form; said elongated cylindrical conductive member having a polygonal outer cross-section, whereby said polygon shape is keyed into and between adjacent trapezoidal-shaped segments to prevent relative rotation between said cylindrical conductive member and said stranded conductor.

* * * * *